(No Model.)
J. LAMUTH.
DRAFT EQUALIZER.
No. 482,370. Patented Sept. 13, 1892.
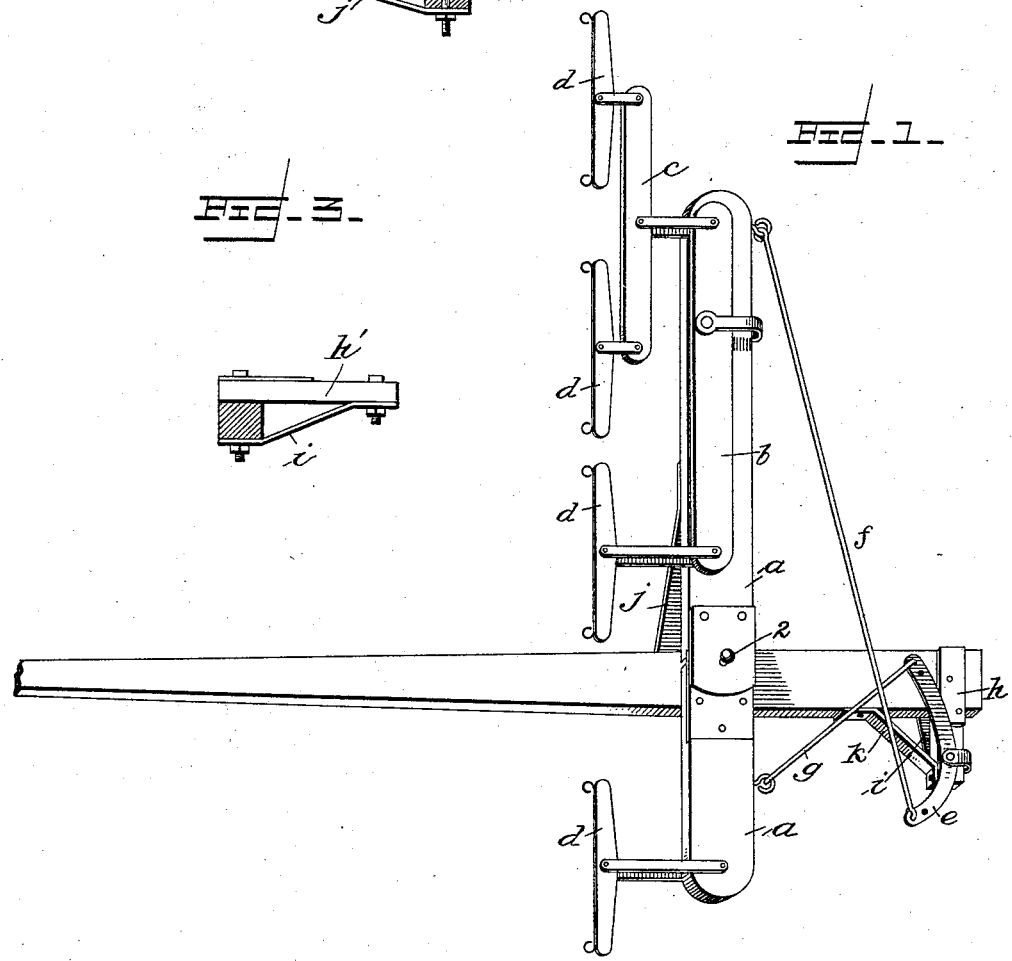
Witnesses
Edw. S. Duvall Jr.
Wm L. Boyden
Inventor
John Lamuth
per Fred S. Vasker
Asso. Attorney

UNITED STATES PATENT OFFICE.

JOHN LAMUTH, OF IRVINGTON, IOWA.

DRAFT-EQUALIZER.

SPECIFICATION forming part of Letters Patent No. 482,370, dated September 13, 1892.

Application filed May 22, 1890. Serial No. 352,808. (No model.)

*To all whom it may concern:*

Be it known that I, JOHN LAMUTH, a citizen of the United States, residing at Irvington, Kossuth county, State of Iowa, have invented a new and useful Four-Horse Equalizer or Evener, of which the following is a specification.

My invention relates to an equalizer to be used on harvesters, plows, or other machines or vehicles where it is desirable to use or drive four horses abreast; and the objects of the invention are, first, to use four horses abreast; second, to equalize the draft of said horses, so that each one will draw his proper and proportionate amount of load or do his proper or proportionate amount of the work. I attain these objects by the mechanism shown in the accompanying drawings, in which—

Figure 1 is a plan view of my improved four-horse equalizer. Fig. 2 is a detail view, partly in section, showing the main levers and their connection with the tongue; and Fig. 3 is another detail view showing the manner of connecting a block to the tongue near the end of the latter.

Fig. 1 exhibits a four-horse evener or equalizer, by which four horses may be driven or worked abreast on any harvester, plow, or in any work where four horses are necessary or desirable.

$a\ a$ denote two levers, which are connected to the tongue and together constitute the main cross-bar, which two pieces are joined by a pin at the point marked with the figure 2, arranged with a joint, so as to be worked separately.

$b$ is a shorter cross-bar fastened on top of the main cross-bar $a$ with a clevis-pin to the right of the center, being in effect a three-horse evener.

$c$ is a short bar attached by two straps of iron (one over and one under) to the cross-bar $b$, being in effect a two-horse evener.

$d\ d\ d\ d$ are singletrees for four horses, as contemplated by the design.

$e$ is a curved iron bar attached by a clevis and pin to the block $h$, being the equalizer, and operated by the iron rods $f$ and $g$, extending from the same to the cross-bar $a$, as shown in Fig. 1.

$h$ is a block attached to tongue or pole of harvester or other machine on which the four-horse evener or equalizer is used. There is a cross-brace $k$ from near the outer end of the block $h$ to the pole or tongue.

$i$ is an iron brace under the block $h$ for the purpose of strengthening said block.

$j$ is an iron brace under the long arm of the main cross-bar $a$ and attached thereto and to the tongue or pole for the purpose of strengthening the same and holding said cross-bar $a$ up in position.

$k$ is the iron cross-brace above referred to.

I claim—

1. In a draft-equalizer, the combination of the main tongue, the whiffletrees, the transverse levers $a\ a$, joined together at their contiguous or meeting ends and pivoted at that point upon the tongue, the rear curved bar $e$, pivotally supported upon the horizontal block $h$, attached to the tongue and projecting outward therefrom on one side thereof, it being firmly supported by means of a brace, a rod $f$, extending from one end of the curved bar $e$ to the oppositely-located main lever $a$, and the rod $g$, extending from the other end of the bar $e$ to the other of the levers $a$, said rods $f$ and $g$ being pivotally attached at their ends, all arranged to operate substantially as described.

2. The combination of the tongue, the levers $a\ a$, joined together and pivoted to the tongue by means of the pivot 2, the whiffletrees $d$, the brace $j$, the cross-bar $b$, supported on one lever $a$, the cross-bar $c$, supported on cross-bar $b$, the block $h$, attached to the tongue, curved bar $e$, pivoted to block $h$, and the rods $f$ and $g$, connected at their outer ends to the levers $a\ a$ and at their inner ends to the ends of the curved bar $e$, substantially as described.

JOHN LAMUTH.

Witnesses:
M. STEPHENS,
JOS. W. WADSWORTH.